Patented Oct. 12, 1926.

1,602,840

UNITED STATES PATENT OFFICE.

JAMES ROSCOW, OF PATERSON, NEW JERSEY.

PROCESS OF WEIGHTING SILK.

No Drawing. Application filed July 15, 1925. Serial No. 43,866.

This invention consists in a novel method of weighting silk by which the weighted silk has a better feel and finish than tin-weighted silk, which does not "tender" the silk, that is to say, have a destructive action thereon, and in the practice of which there is much less loss of the weighting substance used than in tin-weighting processes.

My invention contemplates weighting the silk with barium sulphate, though not by simply preparing the sulphate and then subjecting the silk thereto because I have found that procedure of that nature leaves the sulphate when the silk is dried so weakly established that the (dried) sulphate may be readily dislodged by simply beating or shaking the silk; in such case there is only such a mechanical adhesion between the silk and the sulphate as endures until the deposit of sulphate on the silk dries, when it may be readily dislodged. More specifically, therefore, my invention contemplates effecting the weighting by causing the reaction whereby the barium sulphate is produced to take place actually in the presence of the silk or in situ.

Describing what I have found to be the best manner of carrying out my method:

I first treat the silk to a solution of barium chlorid in any manner whereby the silk becomes thoroughly impregnated with the solution, as by soaking the silk in a barium chlorid bath. The silk is then removed from the bath and deprived of the excess of the barium chlorid solution by a wringing operation, or it may be by whizzing it in a hydro-extractor. The silk, and incidentally the barium chlorid left deposited thereon, is then dried in any manner. The object of the drying step is to insure against the carrying away of more or less of the barium chlorid from the silk by the solution to which the silk is subjected in the next succeeding treatment, to the end that the reaction ensuing on such next treatment shall take place substantially in the silk itself, insuring weighting to the degree predetermined and also uniform in character.

The dried silk is then treated to a solution of sulphuric acid in any manner whereby the silk will become thoroughly impregnated with this solution and the desired reaction will take place, as by soaking the silk in a bath of sulphuric acid solution. The consequent reaction produces barium sulphate, which is precipitated in the silk,—and it may be remarked is so firmly established therein that there is even no known chemical reagent by which it may be removed.

Because the reaction has occurred in the presence of the silk, or in situ, the barium sulphate is firmly established in the fibres of the silk, this result being best accomplished, as indicated, if before the sulphuric acid treatment drying is effected, whereby the barium chlorid will be actually present in the silk at the instant of reaction so that not only the predetermined amount of weighting but the uniformity thereof in the fabric will ensue.

The barium chlorid solution and the sulphuric acid solution are respectively 50% and 10%.

In place of barium chlorid I may use any other soluble barium salt, and in place of sulphuric acid I may use any other soluble sulphate, as sodium sulphate.

Silk weighted by my method is not weakened as in the case of tin-weighted silk; it has a superior feel and finish; and because in the preferred manner of performance as herein described the excess of barium chlorid solution is removed from the silk before the reagent is caused to act no appreciable loss of the chlorid in the reagent and the necessity to recover the same therefrom arises.

Having thus fully described my invention what I claim and desire to secure by Letters Patent is:—

1. The method of weighting silk which consists in wetting the silk with a solution of a soluble barium salt, then converting the thus wetted silk to a dry state, and then causing a solution of a soluble sulphate to react on the residual barium salt.

2. The method of weighting silk which consists in applying to the silk a solution of a soluble barium salt, then converting the thus wetted silk to a dry state, and then causing a solution of a soluble sulphate to react on the residual barium salt.

3. The method of weighting silk which consists in wetting the silk with a solution of a soluble barium salt, then drying on the silk the barium salt, and then causing a solution of a soluble sulphate to react on the dried barium salt on the silk.

4. The method of weighting silk which consists in applying to the silk a solution of a soluble barium salt, then drying on the silk the barium salt, and then causing a solution of a soluble sulphate to react on the dried barium salt on the silk.

In testimony whereof I affix my signature.

JAMES ROSCOW.